(12) United States Patent
Murui et al.

(10) Patent No.: US 12,063,007 B2
(45) Date of Patent: Aug. 13, 2024

(54) ELECTRIC TOOL, MOTOR CONTROL METHOD, AND NON-TRANSITORY STORAGE MEDIUM

(71) Applicant: Panasonic Corporation, Osaka (JP)

(72) Inventors: Itaru Murui, Nara (JP); Kotaro Momoeda, Mie (JP); Shota Fujii, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 122 days.

(21) Appl. No.: 17/498,424

(22) Filed: Oct. 11, 2021

(65) Prior Publication Data

US 2022/0115969 A1 Apr. 14, 2022

(30) Foreign Application Priority Data

Oct. 12, 2020 (JP) .................................. 2020-172202

(51) Int. Cl.
| | |
|---|---|
| *H02P 6/08* | (2016.01) |
| *B25F 5/00* | (2006.01) |
| *H02K 7/14* | (2006.01) |
| *H02K 11/33* | (2016.01) |
| *H02P 6/24* | (2006.01) |

(52) U.S. Cl.
CPC .................. *H02P 6/08* (2013.01); *B25F 5/00* (2013.01); *H02K 7/145* (2013.01); *H02K 11/33* (2016.01); *H02P 6/24* (2013.01)

(58) Field of Classification Search
CPC ....................................................... B25F 5/00
See application file for complete search history.

(56) References Cited

U.S. PATENT DOCUMENTS

| | | | | |
|---|---|---|---|---|
| 9,660,562 | B2* | 5/2017 | Yoo ......................... | H02P 21/18 |
| 11,329,597 | B2* | 5/2022 | Vanko .................... | H02P 7/2913 |
| 2002/0053892 | A1* | 5/2002 | Schaer ....................... | B25F 5/00 |
| | | | | 318/432 |
| 2010/0307782 | A1* | 12/2010 | Iwata .................. | H02P 29/0241 |
| | | | | 173/217 |

(Continued)

FOREIGN PATENT DOCUMENTS

| | | |
|---|---|---|
| EP | 1 186 383 A2 | 3/2002 |
| EP | 1 398 119 A1 | 3/2004 |

(Continued)

OTHER PUBLICATIONS

Extended European Search Report dated Mar. 17, 2022 issued in the corresponding European Patent Application No. 21201956.6.

*Primary Examiner* — Lucas E. A. Palmer
(74) *Attorney, Agent, or Firm* — Rimon P.C.

(57) ABSTRACT

An electric tool includes: a motor; an attachment unit to receive a tip tool attached thereto; a drive control unit to control the motor; a number of revolutions detection unit; and a torque detection unit. The number of revolutions detection unit detects a number of revolutions of a first detection target shaft. The torque detection unit detects a load torque of a second detection target shaft. The drive control unit detects, based on the number of revolutions and load torque detected, an unstable behavior of at least one of the tip tool, the first detection target shaft, or the second detection target shaft and either decelerates, or stops running, the motor when detecting the unstable behavior.

7 Claims, 4 Drawing Sheets

(56) References Cited

U.S. PATENT DOCUMENTS

| | | | |
|---|---|---|---|
| 2015/0042246 A1* | 2/2015 | Tadokoro | H02P 6/34 |
| | | | 318/114 |
| 2015/0042247 A1* | 2/2015 | Kusakawa | H02P 7/2913 |
| | | | 318/700 |
| 2015/0047866 A1* | 2/2015 | Sakai | B25F 5/001 |
| | | | 173/217 |
| 2015/0137721 A1* | 5/2015 | Yamamoto | H02P 23/14 |
| | | | 318/400.15 |
| 2016/0008961 A1* | 1/2016 | Takano | B25F 5/00 |
| | | | 173/2 |
| 2017/0008156 A1* | 1/2017 | Miyazaki | B25B 23/1475 |
| 2018/0038546 A1* | 2/2018 | Nishimiya | B25F 5/00 |
| 2018/0361558 A1* | 12/2018 | Fuchs | B25F 5/00 |
| 2019/0263015 A1* | 8/2019 | Huber | B27B 5/29 |
| 2020/0130153 A1* | 4/2020 | Yoneda | B25B 23/147 |

FOREIGN PATENT DOCUMENTS

| | | |
|---|---|---|
| JP | 2015-100858 A | 6/2015 |
| WO | 2009/102082 A2 | 8/2009 |

* cited by examiner

ELECTRIC TOOL, MOTOR CONTROL METHOD, AND NON-TRANSITORY STORAGE MEDIUM

CROSS-REFERENCE TO RELATED APPLICATIONS

The present application is based upon, and claims the benefit of priority to, Japanese Patent Application No. 2020-172202, filed on Oct. 12, 2020, the entire contents of which are incorporated herein by reference.

TECHNICAL FIELD

The present disclosure generally relates to an electric tool, a motor control method, and a non-transitory storage medium, and more particularly relates to an electric tool, a motor control method, and a non-transitory storage medium, all of which are configured or designed to control a motor.

BACKGROUND ART

JP 2015-100858 A discloses an electric tool designed to stop running, or decelerating, the motor upon detecting a steep increase in load (e.g., when a kickback occurs). Specifically, the electric tool of JP 2015-100858 A calculates an inertial torque of the motor and either stops running, or decelerates, the motor when finding the inertial torque thus calculated greater than an inertial torque reference value.

SUMMARY

Recently, there has been an increasing demand for electric tools such as the one disclosed in JP 2015-100858 A to accurately detect any unstable behavior that would possibly cause a kickback and other inconveniences.

The present disclosure provides an electric tool, a motor control method, and a non-transitory storage medium, all of which are configured or designed to accurately detect an unstable behavior.

An electric tool according to an aspect of the present disclosure includes a motor, an attachment unit, a transmission mechanism, a drive control unit, a number of revolutions detection unit, and a torque detection unit. The attachment unit receives a tip tool attached thereto. The transmission mechanism transmits motive power of the motor to the attachment unit. The drive control unit controls the motor. The number of revolutions detection unit detects a number of revolutions of a first detection target shaft arranged between the motor and the tip tool. The torque detection unit detects a load torque of a second detection target shaft arranged between the motor and the tip tool. The drive control unit detects, based on the number of revolutions detected by the number of revolutions detection unit and the load torque detected by the torque detection unit, an unstable behavior of at least one of the tip tool, the first detection target shaft, or the second detection target shaft and either decelerates, or stops running, the motor when detecting the unstable behavior.

A motor control method according to another aspect of the present disclosure is a method for controlling a motor of an electric tool. The electric tool includes: the motor; an attachment unit to receive a tip tool attached thereto; and a transmission mechanism to transmit motive power of the motor to the attachment unit. The motor control method includes a number of revolutions detecting step, a torque detecting step, an unstable behavior detecting step, and a control step. The number of revolutions detecting step includes detecting a number of revolutions of a first detection target shaft arranged between the motor and the tip tool. The torque detecting step includes detecting a load torque of a second detection target shaft arranged between the motor and the tip tool. The unstable behavior detecting step includes detecting, based on the number of revolutions detected in the number of revolutions detecting step and the load torque detected in the torque detecting step, an unstable behavior of at least one of the tip tool, the first detection target shaft, or the second detection target shaft. The control step includes either decelerating, or stop running, the motor when detecting the unstable behavior in the unstable behavior detecting step.

A non-transitory storage medium according to still another aspect of the present disclosure stores thereon a program designed to cause one or more processors to perform the motor control method described above.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Embodiments of the present disclosure will now be described in detail with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. That is to say, the ratio of the dimensions (including thicknesses) of respective constituent elements illustrated on the drawings does not always reflect their actual dimensional ratio. Note that the arrows indicating respective directions on the drawings are only examples and should not be construed as defining the directions in which the electric tool 1 is supposed to be used. Furthermore, those arrows indicating the respective directions are shown on the drawings only as an assistant to description and are insubstantial ones.

(1) Overview

First, an overview of an electric tool 1 according to an exemplary embodiment will be described with reference to FIGS. 1 and 2.

Figure 2:
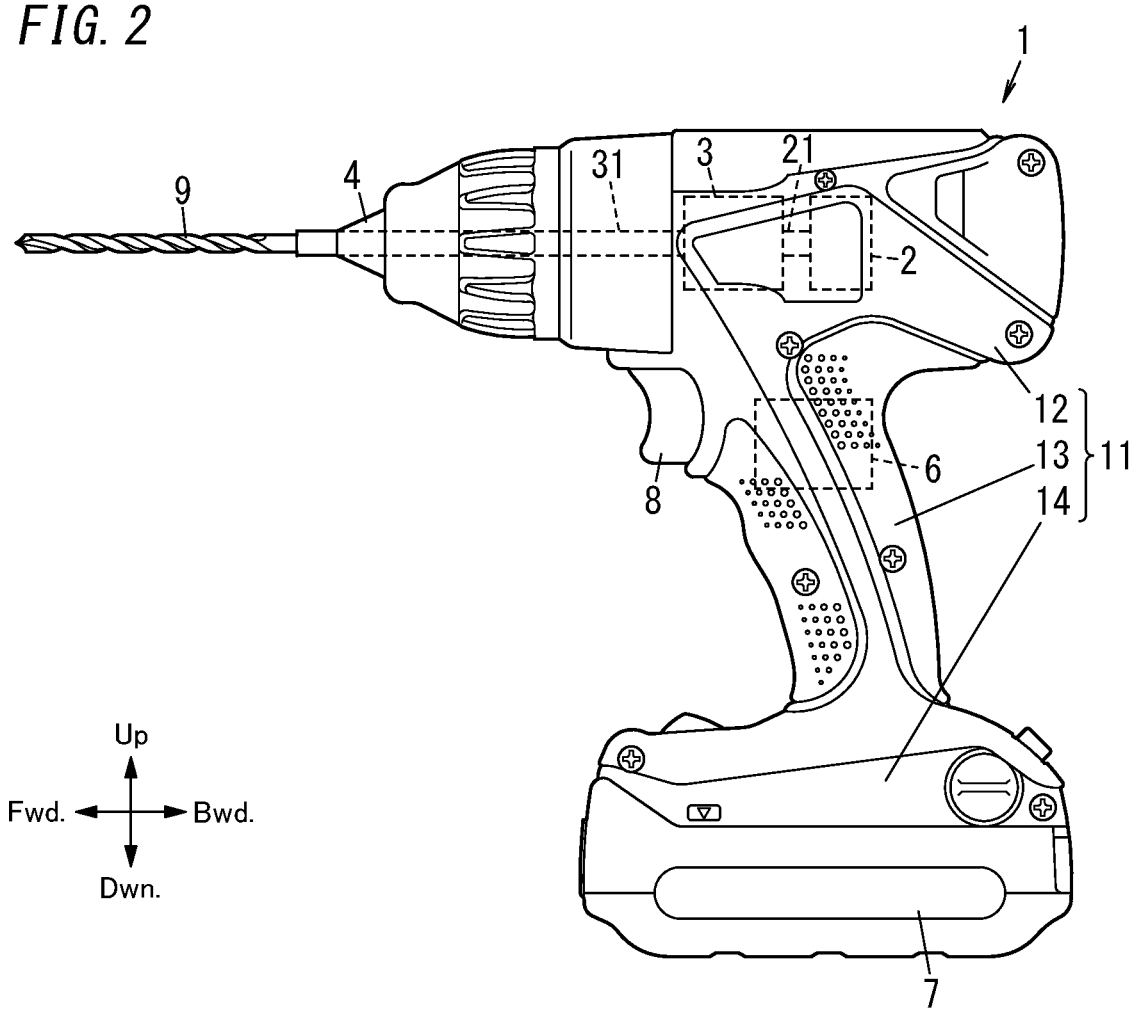
FIG. 2 is a schematic representation illustrating a schematic configuration for the electric tool.

The electric tool 1 operates with motive power (such as electric power) supplied from a motive power source such as a battery pack 7 as shown in FIG. 2. Specifically, the rotary shaft 21 of a motor 2 supplied with electric power from the battery pack 7 turns to transmit rotational driving force to an attachment unit 4 via a transmission mechanism 3. If a tip tool such as a screwdriver bit 9 is attached to the attachment unit 4, the electric tool 1 may attach a member to be fastened (such as a screw) to a workpiece as the target of machining work. That is to say, the electric tool 1 according to this embodiment is an electric screwdriver. Also, the electric tool 1 according to this embodiment is not an impact screwdriver for fastening a member to be fastened with impact applied to the tip tool but is a drill screwdriver.

Figure 1:
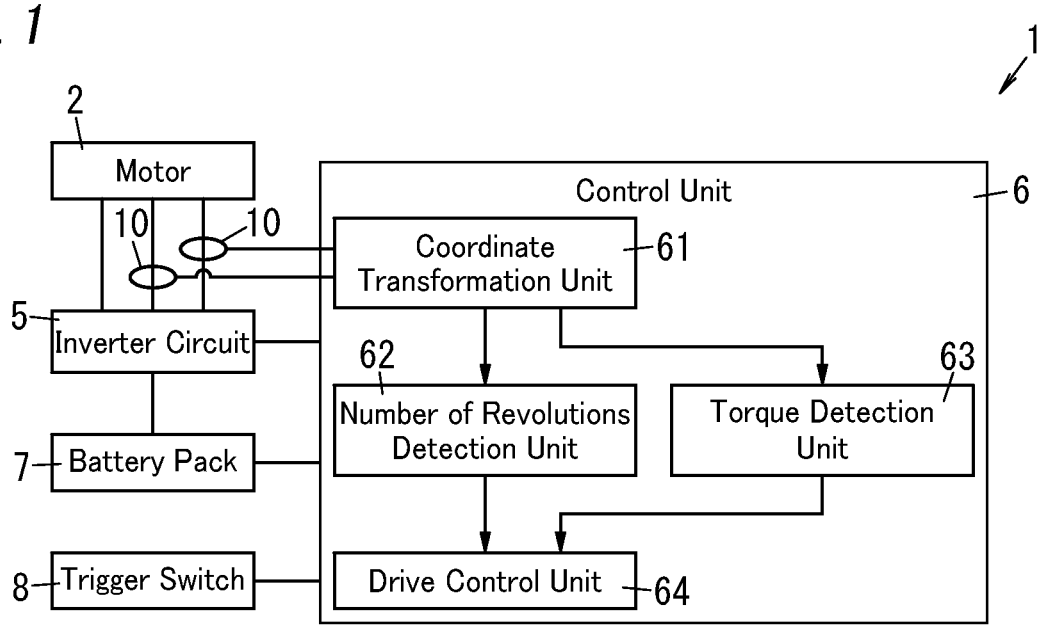
FIG. 1 is a block diagram illustrating a functional configuration for an electric tool according to an exemplary embodiment.

As shown in FIG. 1, the electric tool 1 according to this embodiment includes a number of revolutions detection unit 62, a torque detection unit 63, and a drive control unit 64.

The number of revolutions detection unit 62 according to this embodiment detects the number of revolutions of a first detection target shaft arranged between the motor 2 and the tip tool. As used herein, the "first detection target shaft arranged between the motor 2 and the tip tool" includes the rotary shaft 21 of the motor 2 (see FIG. 2), an output shaft 31 (see FIG. 2), and the shaft of a tip tool such as a screwdriver bit 9. Also, as used herein, "to detect the number of revolutions" includes detecting the rotational velocity (angular velocity) and detecting the angular acceleration.

The torque detection unit 63 according to this embodiment detects the load torque of a second detection target shaft arranged between the motor 2 and the tip tool. As used herein, the "second detection target shaft arranged between the motor 2 and the tip tool" includes the rotary shaft 21 of the motor 2, the output shaft 31, and the shaft of a tip tool such as a screwdriver bit 9. Note that the first detection target shaft and the second detection target shaft may be the same shaft or two different shafts, whichever is appropriate. In this embodiment, the first detection target shaft and the second detection target shaft are both the rotary shaft 21 of the motor 2.

The drive control unit 64 controls the motor 2. Also, the drive control unit 64 according to this embodiment detects an unstable behavior based on the number of revolutions detected by the number of revolutions detection unit 62 and the load torque detected by the torque detection unit 63. As used herein, the "unstable behavior" refers to a behavior in a situation where the balance between the number of revolutions of the motor 2 and the load torque has been lost (i.e., a state where the load torque has increased to the point that a so-called "kickback" and other inconveniences could occur). As used herein, the situation where "the balance between the number of revolutions of the motor 2 and the load torque has been lost" may refer to a situation where the number of revolutions is low for the magnitude of the load torque. More specifically, the "unstable behavior" herein refers to a situation where the loss of the balance between the number of revolutions and the load torque of the motor 2 would cause instability in the behavior of at least one of the tip tool such as the screwdriver bit 9, the output shaft 31, or the rotary shaft 21 of the motor 2. For example, the drive control unit 64 according to this embodiment detects an unstable behavior in a situation where the number of revolutions r1 of the rotary shaft 21 of the motor 2 has decreased and the load torque Tq1 of the rotary shaft 21 has increased. The drive control unit 64 performs control of either decelerating, or stopping running, the motor 2 (hereinafter referred to as "motor stop processing") on detecting the unstable behavior.

The electric tool 1 according to this embodiment may detect the unstable behavior accurately by making the drive control unit 64 detect the unstable behavior based on the number of revolutions detected by the number of revolutions detection unit 62 and the load torque detected by the torque detection unit 63.

(2) Configuration for Electric Tool

First, a detailed configuration for the electric tool 1 according to this embodiment will be described with reference to FIGS. 1 and 2. In the following description, the direction in which the rotary shaft 21 and the output shaft 31 shown in FIG. 2 are arranged side by side is hereinafter defined as a forward/backward direction with the direction pointing from the output shaft 31 toward the attachment unit 4 supposed to be the forward direction and with the direction pointing from the output shaft 31 toward the motor 2 supposed to be the backward direction. In addition, in the following description, the direction in which a barrel 12 and a grip portion 13 to be described later are arranged one on top of the other will be hereinafter defined as an upward/downward direction with the direction pointing from the grip portion 13 toward the barrel 12 supposed to be the upward direction and with the direction pointing from the barrel 12 toward the grip portion 13 supposed to be the downward direction.

As shown in FIG. 2, the electric tool 1 includes a body 11 and a trigger switch 8.

The body 11 includes the barrel 12, the grip portion 13, and a battery attachment portion 14. The barrel 12 has the shape of a cylinder having an opening at the tip (front end) thereof and a closed bottom at the rear end thereof. The barrel 12 houses the motor 2 and the transmission mechanism 3 therein. The grip portion 13 protrudes downward from the barrel 12. The grip portion 13 houses a part of the trigger switch 8. The battery attachment portion 14 is configured such that a battery pack 7 is attachable to, and removable from, the battery attachment portion 14. In this embodiment, the battery attachment portion 14 is provided at the tip portion (i.e., at the bottom) of the grip portion 13. In other words, the barrel 12 and the battery attachment portion 14 are coupled together via the grip portion 13.

The electric tool 1 according to this embodiment operates by being powered by the battery pack 7. That is to say, the battery pack 7 is a power supply that supplies a current for driving the motor 2. In this embodiment, the battery pack 7 is not a constituent element of the electric tool 1. However, this is only an example and should not be construed as limiting. Alternatively, the electric tool 1 may include the battery pack 7 as one of constituent elements thereof. The battery pack 7 includes an assembled battery formed by connecting a plurality of secondary batteries (such as lithium-ion batteries) in series and a case in which the assembled battery is housed.

As shown in FIG. 2, the trigger switch 8 protrudes from the grip portion 13. The trigger switch 8 is an operating member for accepting an operating command for controlling the rotation of the motor 2. The electric tool 1 is configured that the ON/OFF states of the motor 2 may be switched by pulling the trigger switch 8. In addition, the rotational velocity of the motor 2 is adjustable by the manipulative variable indicating how deep the trigger switch 8 has been pulled. Specifically, the greater the manipulative variable is, the higher the rotational velocity of the motor 2 becomes.

As shown in FIG. 1, the electric tool 1 includes the motor 2 the transmission mechanism 3 (see FIG. 2), the attachment unit 4 (see FIG. 2), an inverter circuit 5, the control unit 6, and a plurality of (e.g., two in the example illustrated in FIG. 1) current detection units 10.

The motor 2 may be a brushless motor, for example. In particular, the motor 2 according to this embodiment is a synchronous motor. More specifically, the motor 2 may be implemented as a permanent magnet synchronous motor (PMSM). The motor 2 includes a rotor with a permanent magnet and a stator with three armature windings for the three phases of U, V, and W phases. The rotor includes the rotary shaft 21 (see FIG. 2).

As shown in FIG. 2, the transmission mechanism 3 is arranged forward of the motor 2, of which the rotary shaft 21 is mechanically connected to the transmission mechanism 3. The transmission mechanism 3 reduces the rotational driving force (motive power) of the motor 2 at a predetermined reduction ratio and outputs the rotational driving force thus reduced to the output shaft 31. The attachment unit 4 is mechanically connected to the output shaft 31. In other words, the transmission mechanism 3 transmits the rotational driving force of the motor 2 to the attachment unit 4.

The attachment unit 4 is arranged at the tip of the barrel 12. A tip tool such as a screwdriver bit 9 may be attached to the attachment unit 4. The attachment unit 4 transmits, to the screwdriver bit 9, the rotational driving force that has been transmitted thereto from the transmission mechanism 3. Thus, as the rotary shaft 21 of the motor 2 rotates, the screwdriver bit 9 also turns accordingly. Turning the screwdriver bit 9 in contact with a member to be fastened allows the machining work of fastening or loosening the member to be fastened to be done.

Note that the screwdriver bit 9 is attachable to, and removable from, the attachment unit 4. In this embodiment, a tip tool such as the screwdriver bit 9 is not one of constituent elements of the electric tool 1. However, this is only an example of the present disclosure and should not be construed as limiting. Alternatively, the tip tool may also be one of the constituent elements of the electric tool 1.

As shown in FIG. 1, the inverter circuit 5 converts the power supplied from the battery pack 7 into power in three phases (namely, U, V, and W phases) in accordance with an instruction given by the (drive control unit 64 of the) control unit 6 and supplies the three-phase power thus converted to the motor 2.

The two current detection units 10 measure drive currents in at least two phases out of the drive currents supplied in three phases from the inverter circuit 5 to the motor 2. In this embodiment, the two current detection units 10 measure a U-phase drive current and a V-phase drive current, respectively. The current detection units 10 according to this embodiment may be implemented as, for example, shunt resistors.

The control unit 6 includes a computer system including one or more processors and a memory. At least some of the functions of the control unit 6 are performed by making the processor of the computer system execute a program stored in the memory of the computer system. The program may be stored in the memory. The program may also be downloaded via a telecommunications line such as the Internet or distributed after having been stored in a non-transitory storage medium such as a memory card.

The control unit 6 according to this embodiment performs vector control by breaking down a motor current into a torque current i1 (q-axis current) that generates a torque and an excitation current (d-axis current) that generates a magnetic flux and controlling the respective current components independently of each other. When this vector control is performed, a rotational coordinate system that rotates at the same velocity as the magnetic flux generated by a permanent magnet provided for the rotor of the motor 2 is taken into consideration. In the rotational coordinate system, the direction of the magnetic flux generated by the permanent magnet is defined to be the d-axis and an axis estimated for the purpose of control and corresponding to the d-axis is defined to be a γ-axis. In addition, a phase leading by an electrical angle of 90 degrees with respect to the d-axis is defined to be a q-axis and a phase leading by an electrical angle of 90 degrees with respect to the γ-axis and estimated for the purpose of control is defined to be a δ-axis. The rotational coordinate system corresponding to a real axis is a coordinate system, of which the coordinate axis is defined by the d-axis and the q-axis (hereinafter referred to as a "dq-axis"). The rotational coordinate system estimated for the purpose of control is a coordinate system, of which the coordinate axis is defined by the γ-axis and the δ-axis (hereinafter referred to as a "γδ-axis"). The control unit 6 performs the vector control basically such that the phase of the dq axis and the phase of the γδ-axis match each other. More specifically, the control unit 6 performs phase-locked loop (PLL) control such that the phase shift between the phase of the dq axis and the phase of the γδ-axis goes zero.

As shown in FIG. 1, the control unit 6 according to this embodiment includes a coordinate transformation unit 61, a number of revolutions detection unit 62, a torque detection unit 63, and a drive control unit 64.

The coordinate transformation unit 61 performs coordinate transformation on the U-phase drive current and V-phase drive current respectively detected by the two current detection units 10 to calculate a γ-axis current and a δ-axis current. Then, the coordinate transformation unit 61 outputs information about the γ-axis current and the δ-axis current to the number of revolutions detection unit 62 and the torque detection unit 63.

The number of revolutions detection unit 62 estimates coordinates on the dq axis (hereinafter referred to as "dq-axis coordinates") by performing proportional-integral control, for example, using the γ-axis current or the δ-axis current, for example, for the purpose of PLL control. The number of revolutions detection unit 62 according to this embodiment detects the number of revolutions of the rotary shaft 21 of the motor 2 based on the dq axis coordinates thus estimated. The number of revolutions detection unit 62 according to this embodiment calculates the number of revolutions r1 of the rotary shaft 21 of the motor 2 based on the value of the d-axis current (excitation current), which is in turn based on the dq-axis coordinates estimated. The number of revolutions detection unit 62 according to this embodiment calculates the number of revolutions r1 of the motor 2 based on the value of the excitation current required for the vector control (PLL control), and therefore, there is no need for the electric tool 1 to be provided with any additional sensor such as an encoder. Various methods have been proposed as methods for calculating the number of revolutions r1. The number of revolutions detection unit 62 may adopt any of those known methods. The number of revolutions detection unit 62 outputs the number of revolutions r1 thus calculated to the drive control unit 64.

The torque detection unit 63 estimates dq-axis coordinates by performing proportional-integral control, for example, using the γ-axis current or the δ-axis current, for example, for the purpose of PLL control. The torque detection unit 63 according to this embodiment detects the load torque Tq1 of the rotary shaft 21 of the motor 2 based on the dq axis coordinates thus estimated. The torque detection unit 63 according to this embodiment calculates the load torque Tq1 of the rotary shaft 21 of the motor 2 based on the value of the q-axis current (torque current i1), which is in turn based on the dq-axis coordinates estimated. The torque detection unit 63 according to this embodiment calculates the load torque Tq1 of the motor 2 based on the value of the torque current i1 required for the vector control (PLL control), and therefore, there is no need for the electric tool 1 to be provided with any additional torque sensor. The torque detection unit 63 outputs the load torque Tq1 thus calculated to the drive control unit 64. Alternatively, the torque detection unit 63 may output the value of the torque current i1 based on the dq-axis coordinates estimated as it is to the drive control unit 64. Still alternatively, the torque detection unit 63 may calculate the load torque Tq1 by using the dq-axis coordinates estimated by the number of revolutions detection unit 62 without estimating the dq-axis coordinates by itself. Conversely, the number of revolutions detection unit 62 may calculate the number of revolutions r1 by using the dq-axis coordinate estimated by the torque detection unit 63 without estimating the dq-axis coordinates by itself.

The drive control unit 64 controls the motor 2. The drive control unit 64 determines a command value with respect to the velocity of the motor 2 (hereinafter referred to as a "motor 2 velocity command value") based on the target value of the velocity (rotational velocity) of the motor 2 which is defined by the manipulative variable of the trigger switch 8, for example. Then, the drive control unit 64 determines target values of drive voltages for the U, V, and W phases (voltage command values) such that the velocity of the motor 2 agrees with the motor 2 velocity command value, and outputs the voltage command values to the inverter circuit 5.

In addition, the drive control unit 64 according to this embodiment also detects an unstable behavior based on the number of revolutions r1 of the rotary shaft 21 as detected (calculated) by the number of revolutions detection unit 62 and the load torque Tq1 of the rotary shaft 21 as detected (calculated) by the torque detection unit 63. As used herein, the "unstable behavior" refers to an unstable behavior in a situation where a so-called "kickback" and other inconveniences could occur. In this case, the drive control unit 64 may detect the unstable behavior based on the number of revolutions r1 of the rotary shaft 21 as detected by the number of revolutions detection unit 62 and the torque current i1 detected by the torque detection unit 63. When detecting the unstable behavior, the drive control unit 64 either decelerates, or stops running, the motor 2. When detecting no unstable behaviors, on the other hand, the drive control unit 64 controls the motor 2 in accordance with the command entered by the user through the trigger switch 8.

(3) Operation

Next, the operation performed by the drive control unit 64 to detect the unstable behavior (i.e., a motor control method) will be described with reference to FIGS. 3 and 4.

Figure 3:
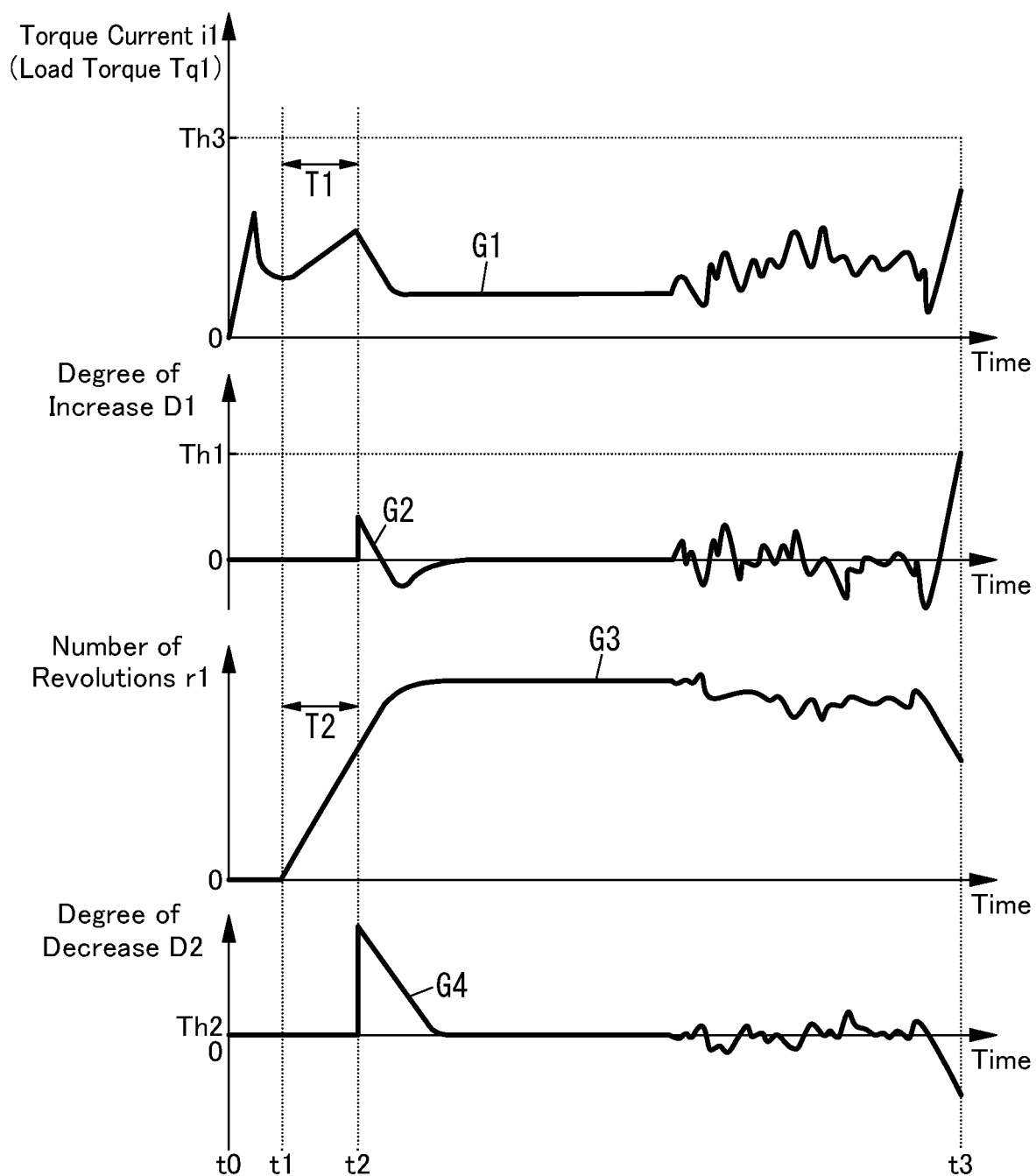
FIG. 3 shows graphs representing how the torque current and the number of revolutions change with time in the electric tool.
Figure 4:
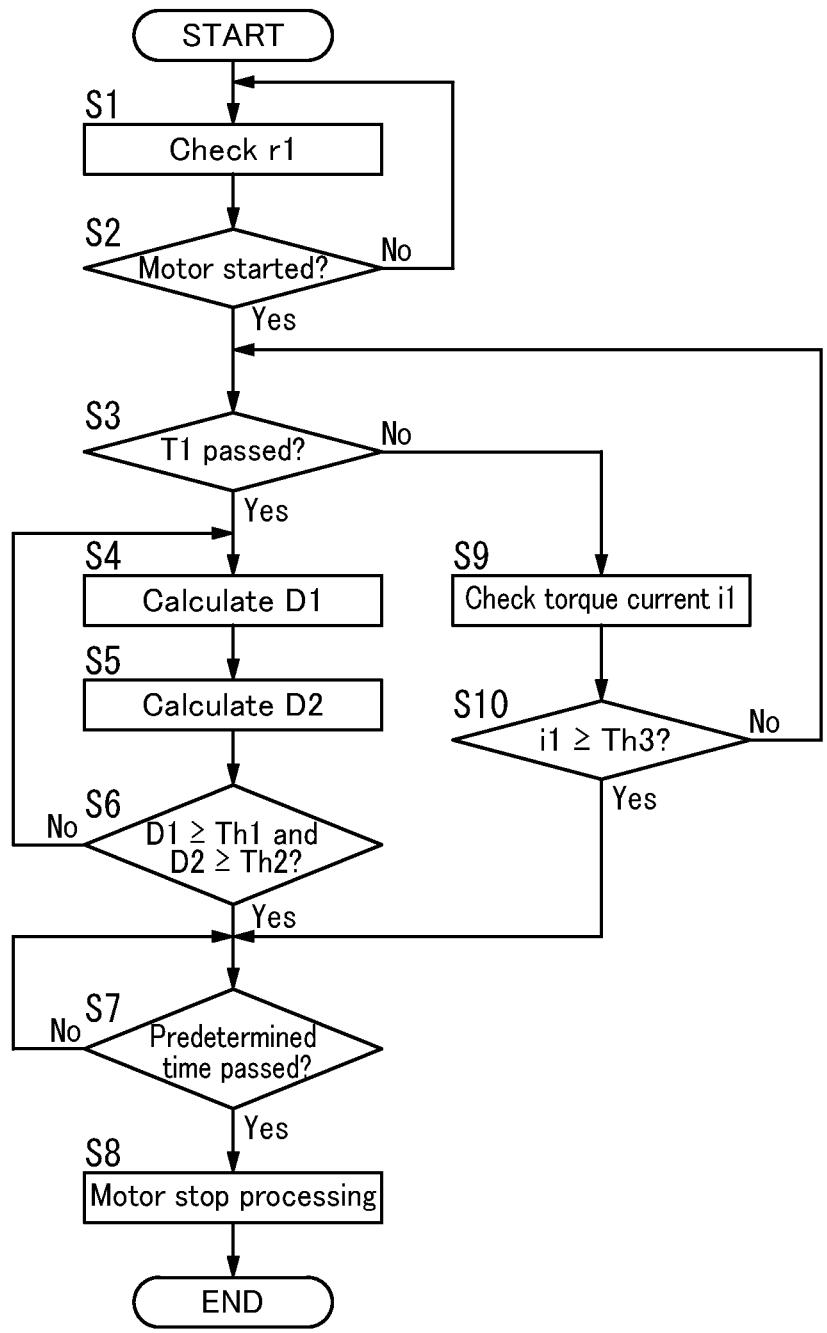
FIG. 4 is a flowchart showing how the electric tool operates.

FIG. 3 shows graphs representing how the torque current i1 (the load torque Tq1) and the number of revolutions r1 change with time. In FIG. 3, the graph G1 shows how the torque current i1 changes with time, the graph G2 shows how the degree of increase D1 in the torque current i1 changes with time, the graph G3 shows how the number of revolutions r1 changes with time, and the graph G4 shows how the degree of decrease D2 in the number of revolutions r1 changes with time.

The drive control unit 64 according to this embodiment detects the unstable behavior based on the degree of increase D1 in the torque current i1 and the degree of decrease D2 in the number of revolutions r1. Specifically, the degree of increase D1 is the degree of increase in the torque current i1 at the end of a first predetermined period T1 with respect to a torque current i1 at the beginning of the first predetermined period T1. In other words, the degree of increase D1 is a degree based on the value obtained by subtracting the torque current i1 at the beginning of the first predetermined period T1 from the torque current i1 at the end of the first predetermined period T1. Note that in the graph G2, the larger the magnitude of the ordinate in the positive domain is, the greater the degree of increase D1 is. The first predetermined period T1 is a period with a predetermined length, of which the end point is defined by the timing when the degree of increase D1 is calculated. The drive control unit 64 according to this embodiment calculates, at every timing of calculating the degree of increase D1, the degree of increase D1 such that the timing to calculate the degree of increase D1 is the end of the first predetermined period T1. The first predetermined period T1 shown in FIG. 3 comes up for the first time since the drive control unit 64 has started the operation of detecting the unstable behavior. That is to say, the first predetermined period T1 shown in FIG. 3 is the first predetermined period T1 at a timing t2. The first predetermined period T1 may have a duration of 200 ms, for example.

The degree of decrease D2 is the degree of decrease in the number of revolutions r1 at the end of a second predetermined period T2 with respect to a number of revolutions r1 at the beginning of the second predetermined period T2. In other words, the degree of decrease D2 is a degree based on the value obtained by subtracting the number of revolutions r1 at the beginning of the second predetermined period T2 from the number of revolutions r1 at the end of the second predetermined period T2. Alternatively, the degree of decrease D2 may also be a degree of decrease in rotational velocity (angular velocity) or angular acceleration. In this embodiment, the smaller the value obtained by subtracting the number of revolutions r1 at the beginning of the second predetermined period T2 from the number of revolutions r1 at the end of the second predetermined period is (i.e., the larger the magnitude of the negative value is), the larger the degree of decrease D2 is. Note that in the graph G4, the value obtained by subtracting the number of revolutions r1 at the beginning of the second predetermined period T2 from the number of revolutions r1 at the end of the second predetermined period is regarded as the degree of decrease D2. Thus, in the graph G4, the larger the magnitude of the ordinate in the negative domain is, the greater the degree of decrease D2 is. The second predetermined period T2 is a period with a predetermined length, of which the end point is defined by the timing to calculate the degree of decrease D2. The drive control unit 64 according to this embodiment calculates, at every timing of calculating the degree of decrease D2, the degree of decrease D2 such that the timing to calculate the degree of decrease D2 is the end of the second predetermined period T2. The second predetermined period T2 shown in FIG. 3 comes up for the first time since the drive control unit 64 has started the operation of detecting the unstable behavior. That is to say, the second predetermined period T2 shown in FIG. 3 is the second predetermined period T2 at the timing t2. The second predetermined period T2 may have a duration of 200 ms, for example, which is as long as the first predetermined period T1 in this embodiment.

The drive control unit 64 detects the unstable behavior if the degree of increase D1 in the torque current i1 is equal to or greater than an increase threshold value Th1 and the degree of decrease D2 in the number of revolutions r1 is equal to or greater than a decrease threshold value Th2. The increase threshold value Th1 of the degree of increase D1 in the torque current i1 suitably falls within the range from about 20 A to about 35 A and may be 25 A, for example. Meanwhile, the threshold value Th2 of the degree of decrease D2 in the number of revolutions r1 may be 0, for example. That is to say, the drive control unit 64 according to this embodiment detects the unstable behavior if the degree of increase D1 in the torque current i1 is equal to or greater than 25 A and the degree of decrease D2 in the number of revolutions r1 is equal to or greater than 0 (i.e., if the value obtained by subtracting the number of revolutions r1 at the beginning of the second predetermined period T2 from the number of revolutions r1 at the end of the second predetermined period is equal to or less than 0). In this embodiment, the decrease threshold value Th2 is 0, and therefore, the situation where "the degree of decrease D2 in the number of revolutions r1 is equal to or greater than 0" will be hereinafter referred to as a situation where "the degree of decrease D2 in the number of revolutions r1 is equal to or greater than the decrease threshold value Th2." In the example illustrated in FIG. 3, at a timing t3, the degree of increase D1 in the torque current i1 is equal to or greater than the increase threshold value Th1 and the degree of decrease D2 in the number of revolutions r1 is equal to or greater than the decrease threshold value Th2 (i.e., the value obtained by subtracting the number of revolutions r1 at the beginning of the second predetermined period T2 from the number of revolutions r1 at the end of the second predetermined period T2 is equal to or less than the decrease threshold value Th2). Thus, the drive control unit 64 detects the unstable behavior at the timing t3.

In addition, the drive control unit 64 according to this embodiment performs motor stop processing when a predetermined time period has passed since the timing t3 when the unstable behavior was detected. In other words, the drive control unit 64 delays the start of the motor stop processing by a predetermined time lag with respect to the timing t3 when the unstable behavior was detected. Making the unstable behavior continued during the predetermined time period allows the user to recognize the presence of the unstable behavior. In this case, the predetermined time period between the point in time when the drive control unit 64 has detected the unstable behavior and the point in time when the drive control unit 64 starts performing the motor stop processing suitably falls within the range from about 10 ms to about 90 ms, and may be 10 ms, for example.

Furthermore, the drive control unit 64 does not perform the processing of detecting the unstable behavior during a period from the timing t0 when the trigger switch 8 has been turned to the timing t1 when the motor 2 starts running. In other words, the drive control unit 64 starts performing the processing of detecting the unstable behavior at the timing t1 when the motor 2 starts running. In the period from the timing t0 to the timing t1, an inrush current may flow through the motor 2. Thus, the drive control unit 64 starts performing the processing of detecting the unstable behavior at the timing t1 when the motor 2 starts running. This reduces the chances of detecting the unstable behavior erroneously due to the presence of the inrush current.

Furthermore, before the first predetermined period T1 passes since the timing t1 when the motor 2 has started running (i.e., the timing when the unstable behavior starts to be detected), the drive control unit 64 detects the unstable behavior when the absolute value of the torque current i1 is equal to or greater than the threshold value Th3. Then, after the first predetermined period T1 has passed since the timing t1 when the motor 2 has started running, the drive control unit 64 detects the unstable behavior based on the degree of increase D1 in the torque current i1 and the degree of decrease D2 in the number of revolutions r1 as described above. This is because the degree of increase D1 in the torque current i1 cannot be detected until the first predetermined period T1 passes since the timing t1 when the unstable behavior has started to be detected. That is to say, detecting the unstable behavior based on the absolute value of the torque current i1 until the first predetermined period T1 passes since the timing t1 allows the unstable behavior to be detected even during the interval in which the degree of increase D1 in the torque current i1 cannot be detected.

In this case, the threshold value Th3 of the absolute value of the torque current i1 suitably falls within the range from about 40 A to about 70 A and may be 50 A, for example. In this case, the threshold value Th3 is set at a value larger than the increase threshold value Th1 because when the motor 2 is started, a large torque current i1 needs to be supplied to start rotating the rotor (rotary shaft 21) of the motor 2. Setting the threshold value Th3 at a value larger than the increase threshold value Th1 may reduce the chances of detecting the unstable behavior erroneously due to the presence of the torque current i1 when the motor 2 is started.

Next, it will be described with reference to FIG. 4 how the drive control unit 64 performs the operation of detecting the unstable behavior. On detecting that the user has operated the trigger switch 8, the drive control unit 64 starts performing the processing of detecting the unstable behavior. Meanwhile, on sensing the user no longer operate the trigger switch 8 while the drive control unit 64 is performing the processing of detecting the unstable behavior, the drive control unit 64 finishes performing the processing of detecting the unstable behavior.

On starting the processing of detecting the unstable behavior, the drive control unit 64 checks the number of revolutions r1 of the motor 2 (in Step S1). When finding the number of revolutions r1 of the motor 2 is 0 (i.e., if the motor 2 has not started yet) (if the answer is NO in Step S2), the process goes backs to Step S1. On the other hand, when finding the number of revolutions r1 of the motor 2 is not 0 (i.e., if the motor 2 has been started) (if the answer is YES in Step S2), the drive control unit 64 determines whether or not the first predetermined period T1 has passed since the motor 2 started (in Step S3). If the first predetermined period T1 has already passed since the motor 2 started (if the answer is YES in Step S3), then the drive control unit 64 calculates the degree of increase D1 in the torque current i1 (load torque Tq1) and the degree of decrease D2 in the number of revolutions r1 (in Steps S4 and S5). If the degree of increase D1 is equal to or greater than the increase threshold value Th1 and the degree of decrease D2 is equal to or greater than decrease threshold value Th2 (if the answer is YES in Step S6), then the drive control unit 64 detects the unstable behavior. Once the drive control unit 64 has detected the unstable behavior, the drive control unit 64 waits until a predetermined time passes since the detection of the unstable behavior (if the answer is NO in Step S7). When the predetermined time passes (if the answer is YES in Step S7), the drive control unit 64 performs the motor stop processing (in Step S8). The drive control unit 64 that has performed the motor stop processing finishes performing the processing of detecting the unstable behavior.

On the other hand, if it has turned out in Step S6 that the degree of increase D1 is smaller than the increase threshold value Th1 (if the answer is NO in Step S6) or that the degree of decrease D2 is smaller than the decrease threshold value Th2 (if the answer is NO in Step S6), the process goes back to Step S4. In addition, if it has turned out in Step S6 that the degree of increase D1 is smaller than the increase threshold value Th1 and the degree of decrease D2 is smaller than the decrease threshold value Th2 (if the answer is NO in Step S6), the process also goes back to Step S4.

If it has turned out in Step S3 that the first predetermined period T1 has not passed yet since the motor 2 started (if the answer is NO in Step S3), then the drive control unit 64 checks the torque current i1 (load torque Tq1) (in Step S9). If the torque current i1 is smaller than the threshold value Th3 (if the answer is NO in Step S10), the process goes back to Step S3. On the other hand, if the torque current i1 is equal to or greater than the threshold value Th3 (if the answer is YES in Step S10), then the drive control unit 64 detects the unstable behavior. Once the drive control unit 64 has detected the unstable behavior, the drive control unit 64 waits until a predetermined time passes since the detection of the unstable behavior (if the answer is NO in Step S7). When the predetermined time passes (if the answer is YES in Step S7), the drive control unit 64 performs the motor stop processing (in Step S8). The drive control unit 64 that has performed the motor stop processing finishes performing the processing of detecting the unstable behavior.

(4) Variations

Next, variations of the exemplary embodiment described above will be enumerated one after another. Note that the variations to be described below may be adopted in combination with the exemplary embodiment as appropriate.

Optionally, the functions of the electric tool 1 according to the exemplary embodiment described above may also be implemented as, for example, a motor control method, a (computer) program, or a non-transitory storage medium on which the program is stored. A motor control method according to an aspect is a method for controlling a motor 2 of an electric tool 1. The electric tool 1 includes: the motor 2; an attachment unit 4 to receive a tip tool attached thereto; and a transmission mechanism 3 to transmit motive power of the motor 2 to the attachment unit 4. The motor control method includes a number of revolutions detecting step, a torque detecting step, an unstable behavior detecting step, and a control step. The number of revolutions detecting step includes detecting a number of revolutions r1 of a first detection target shaft (rotary shaft 21) arranged between the motor 2 and the tip tool. The torque detecting step includes detecting a load torque Tq1 of a second detection target shaft (rotary shaft 21) arranged between the motor 2 and the tip tool. The unstable behavior detecting step includes detecting, based on the number of revolutions r1 detected in the number of revolutions detecting step and the load torque Tq1 detected in the torque detecting step, an unstable behavior of at least one of the tip tool, the first detection target shaft, or the second detection target shaft. The control step includes either decelerating, or stop running, the motor 2 when detecting the unstable behavior in the unstable behavior detecting step. A program according to another aspect is designed to cause one or more processors to perform the motor control method described above.

The electric tool 1 includes a computer system in its control unit 6, for example. The computer system may include a processor and a memory as principal hardware components thereof. The functions of the control unit 6 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Optionally, the electric tool 1 may include a display unit, a loudspeaker, or any other notification means for notifying, when detecting any unstable behavior, the user that the unstable behavior has been detected. The display unit includes a liquid crystal display and a light-emitting unit such as a light-emitting diode (LED). Alternatively, the electric tool 1 may also notify the user, by vibrations or air pressure, that the unstable behavior has been detected.

The current detection units 10 may be implemented as, for example, hall element current sensors.

The number of revolutions detection unit 62 may detect the number of revolutions r1 of the rotary shaft 21 of the motor 2 by using a hall element current sensor, a photoelectric encoder, or a magnetic encoder. Alternatively, the number of revolutions detection unit 62 may detect the number of revolutions of the output shaft 31, the attachment unit 4, or a tip tool such as the screwdriver bit 9, instead of the number of revolutions r1 of the rotary shaft 21 of the motor 2.

The torque detection unit 63 may detect the load torque Tq1 of the rotary shaft 21 of the motor 2 by using a torque sensor. In that case, the torque sensor may be a magnetostriction strain sensor which may detect torsion strain, for example. The magnetostriction strain sensor detects a variation in permeability corresponding to the strain caused by the application of a torque to the rotary shaft 21 and outputs a voltage signal, of which the magnitude is proportional to the magnitude of the strain. Alternatively, the torque detection unit 63 may detect the load torque of the output shaft 31 or a tip tool such as the screwdriver bit 9, instead of the load torque Tq1 of the rotary shaft 21 of the motor 2.

Optionally, the first predetermined period T1 and the second predetermined period T2 may have mutually different lengths. Note that the first predetermined period T1 and the second predetermined period T2 suitably have a length of about 50 ms to about 500 ms.

(Recapitulation)

As can be seen from the foregoing description, an electric tool (1) according to a first aspect includes a motor (2), an attachment unit (4), a transmission mechanism (3), a drive control unit (64), a number of revolutions detection unit (62), and a torque detection unit (63). The attachment unit (4) receives a tip tool (screwdriver bit 9) attached thereto. The transmission mechanism (3) transmits motive power of the motor (2) to the attachment unit (4). The drive control unit (64) controls the motor (2). The number of revolutions detection unit (62) detects a number of revolutions (r1) of a first detection target shaft (rotary shaft 21) arranged between the motor (2) and the tip tool (screwdriver bit 9). The torque detection unit (63) detects a load torque (Tq1) of a second detection target shaft (rotary shaft 21) arranged between the motor (2) and the tip tool (screwdriver bit 9). The drive control unit (64) detects, based on the number of revolutions (r1) detected by the number of revolutions detection unit (62) and the load torque (Tq1) detected by the torque detection unit (63), an unstable behavior of at least one of the tip tool (screwdriver bit 9), the first detection target shaft (rotary shaft 21), or the second detection target shaft (rotary shaft 21) and either decelerates, or stops running, the motor (2) when detecting the unstable behavior.

This aspect allows the unstable behavior to be detected accurately based on the number of revolutions (r1) detected by the number of revolutions detection unit (62) and the load torque (Tq1) detected by the torque detection unit (63).

In an electric tool (1) according to a second aspect, which may be implemented in conjunction with the first aspect, the drive control unit (64) detects the unstable behavior based on a degree of increase (D1) in the load torque (Tq1) and a degree of decrease (D2) in the number of revolutions (r1).

This aspect enables even an unstable behavior, which would not be detected simply by sensing a significant load torque (Tq1), to be detected based on the degree of increase (D1) in the load torque (Tq1) and the degree of decrease (D2) in the number of revolutions (r1).

In an electric tool (1) according to a third aspect, which may be implemented in conjunction with the second aspect, the drive control unit (64) detects the unstable behavior when finding the degree of increase (D1) in the load torque (Tq1) equal to or greater than an increase threshold value (Th1) and finding the degree of decrease (D2) in the number of revolutions (r1) equal to or greater than a decrease threshold value (Th2). The degree of increase (D1) is a degree of increase in the load torque (Tq1) at an end of a first predetermined period (T1) with respect to the load torque (Tq1) at a beginning of the first predetermined period (T1). The degree of decrease (D2) is a degree of decrease in the number of revolutions (r1) at an end of a second predetermined period (T2) with respect to the number of revolutions (r1) at a beginning of the second predetermined period (T2).

This aspect allows the unstable behavior to be detected by making simple arithmetic operations.

In an electric tool (1) according to a fourth aspect, which may be implemented in conjunction with the third aspect, the first predetermined period (T1) and the second predetermined period (T2) have the same length.

According to this aspect, the first predetermined period (T1) and the second predetermined period (T2) have the same length, thus allowing checking the degree of increase (D1) in the load torque (Tq1) and the degree of decrease (D2) in the number of revolutions (r1) in the periods with the same length. In addition, if the beginning of the first predetermined period (T1) and the beginning of the second predetermined period (T2) are set at the same timing, the load torque (Tq1) and the number of revolutions (r1) may also be measured at the same timing.

In an electric tool (1) according to a fifth aspect, which may be implemented in conjunction with the third or fourth aspect, the drive control unit (64) detects the unstable behavior when finding the load torque (Tq1) equal to or greater than a threshold value (Th3) before the first predetermined period (T1) passes since the motor (2) has started running. In addition, the drive control unit (64) also detects the unstable behavior based on the degree of increase (D1) in the load torque (Tq1) and the degree of decrease (D2) in the number of revolutions (r1) after the first predetermined period (T1) has passed since the motor (2) has started running.

This aspect allows the unstable behavior to be detected even in a situation where the degree of increase in the load torque (Tq1) cannot be detected when the motor (2) has just started running.

In an electric tool (1) according to a sixth aspect, which may be implemented in conjunction with any one of the first to fifth aspects, in case of having detected the unstable behavior, the drive control unit (64) decelerates, or stops running, the motor (2) at a timing when a predetermined time period has passed since the drive control unit (64) has detected the unstable behavior.

This aspect allows notifying the user of the presence of the unstable behavior because the unstable behavior lasts at least for the predetermined time period.

An electric tool (1) according to a seventh aspect, which may be implemented in conjunction with any one of the first to sixth aspects, further includes a current detection unit (10). The current detection unit (10) detects a drive current flowing through the motor (2). The motor (2) is a brushless motor. The number of revolutions detection unit (62) calculates the number of revolutions (r1) based on an excitation current value to be calculated based on a value of the drive current. The torque detection unit (63) calculates the load torque (Tq1) based on a torque current (i1) value to be calculated based on the value of the drive current.

According to this aspect, the number of revolutions (r1) and the load torque (Tq1) are calculated based on the excitation current and the torque current (i1) that have been calculated based on the drive current, thus allowing the number of revolutions (r1) and the load torque (Tq1) to be detected at the same timing. This enables detecting the unstable behavior even more accurately, because the unstable behavior is detected based on the number of revolutions (r1) and the load torque (Tq1) that have been measured at the same timing.

In an electric tool (1) according to an eighth aspect, which may be implemented in conjunction with any one of the first to seventh aspects, the drive control unit (64) postpones starting performing the processing of detecting the unstable behavior until the motor (2) starts running.

This aspect reduces the chances of detecting the unstable behavior erroneously during a period in which a significant load torque (Tq1) is required to start running the motor (2).

Note that the constituent elements according to all aspects but the first aspect are not essential constituent elements for the electric tool (1) but may be omitted as appropriate.

A motor control method according to a ninth aspect is a method for controlling a motor (2) of an electric tool (1). The electric tool (1) includes: the motor (2); an attachment unit (4) to receive a tip tool (screwdriver bit 9) attached thereto; and a transmission mechanism (3) to transmit motive power of the motor (2) to the attachment unit (4). The motor control method includes a number of revolutions detecting step, a torque detecting step, an unstable behavior detecting step, and a control step. The number of revolutions detecting step includes detecting a number of revolutions (r1) of a first detection target shaft (rotary shaft 21) arranged between the motor (2) and the tip tool (screwdriver bit 9). The torque detecting step includes detecting a load torque (Tq1) of a second detection target shaft (rotary shaft 21) arranged between the motor (2) and the tip tool (screwdriver bit 9). The unstable behavior detecting step includes detecting, based on the number of revolutions (r1) detected in the number of revolutions detecting step and the load torque (Tq1) detected in the torque detecting step, an unstable behavior of at least one of the tip tool (screwdriver bit 9), the first detection target shaft (rotary shaft 21), or the second detection target shaft (rotary shaft 21). The control step includes either decelerating, or stop running, the motor (2) when detecting the unstable behavior in the unstable behavior detecting step.

This aspect allows the unstable behavior to be detected accurately based on the number of revolutions (r1) detected in the number of revolutions detecting step and the load torque (Tq1) detected in the torque detecting step.

A non-transitory storage medium according to a tenth aspect stores thereon a program designed to cause one or more processors to perform the motor control method according to the ninth aspect.

This aspect allows the unstable behavior to be detected accurately based on the number of revolutions (r1) detected in the number of revolutions detecting step and the load torque (Tq1) detected in the torque detecting step.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An electric tool comprising:
a motor;
an attachment unit configured to receive a tip tool attached thereto;
a transmission mechanism configured to transmit motive power of the motor to the attachment unit;
a drive control unit configured to control the motor;
a number of revolutions detection unit configured to detect a number of revolutions of a first detection target shaft arranged between the motor and the tip tool; and
a torque detection unit configured to detect a load torque of a second detection target shaft arranged between the motor and the tip tool,
the drive control unit being configured to detect, based on the number of revolutions detected by the number of revolutions detection unit and the load torque detected by the torque detection unit, an unstable behavior of at least one of the tip tool, the first detection target shaft, or the second detection target shaft and to either decelerate, or stop running, the motor when detecting the unstable behavior, and
the drive control unit being configured to detect the unstable behavior based on a degree of increase in the load torque and a degree of decrease in the number of revolutions.

2. The electric tool of claim 1, wherein
the drive control unit is configured to detect the unstable behavior when finding the degree of increase in the load torque at an end of a first predetermined period with respect to the load torque at a beginning of the first predetermined period equal to or greater than an increase threshold value and finding the degree of decrease in the number of revolutions at an end of a second predetermined period with respect to the number of revolutions at a beginning of the second predetermined period equal to or greater than a decrease threshold value.

3. The electric tool of claim 2, wherein the first predetermined period and the second predetermined period have the same length.

4. The electric tool of claim 2, wherein
the drive control unit is configured to:
detect the unstable behavior when finding the load torque equal to or greater than a threshold value Th3 before the first predetermined period passes since the motor has started running, and
detect the unstable behavior based on the degree of increase in the load torque and the degree of decrease in the number of revolutions after the first predetermined period has passed since the motor has started running.

5. The electric tool of claim 1, wherein the drive control unit is configured to, in case of having detected the unstable behavior, decelerate, or stop running, the motor at a timing when a predetermined time period has passed since the drive control unit has detected the unstable behavior.

6. The electric tool of claim 1, further comprising a current detection unit configured to detect a drive current flowing through the motor, wherein
the motor is a brushless motor,
the number of revolutions detection unit is configured to calculate the number of revolutions based on an excitation current value to be calculated based on a value of the drive current, and
the torque detection unit is configured to calculate the load torque based on a torque current value to be calculated based on the value of the drive current.

7. The electric tool of claim 1, wherein the drive control unit is configured to postpone starting performing processing of detecting the unstable behavior until the motor starts running.

* * * * *